(No Model.)

O. F. SILCOTT.
RIM SAW MACHINE.

No. 252,268.  Patented Jan. 10, 1882.

Attest:
J. Wm. Strehli,
E. R. Hill.

Inventor
Oscar F. Silcott
per Wm. Hubbell Fisher
Atty

N. PETERS, Photo-Lithographer, Washington, D. C.

UNITED STATES PATENT OFFICE.

OSCAR F. SILCOTT, OF FELICITY, OHIO.

RIM-SAW MACHINE.

SPECIFICATION forming part of Letters Patent No. 252,268, dated January 10, 1882.

Application filed April 18, 1881. (No model.)

*To all whom it may concern:*

Be it known that I, OSCAR F. SILCOTT, of Felicity, Clermont county, State of Ohio, have invented certain new and useful Improvements in Sawing-Machines, of which the following is a specification.

The object of my invention is to provide a hand-power sawing-machine in which a circular saw is employed, thereby gaining all the advantages of a continuous cut; and the principal feature of my invention consists in a saw of peculiar construction, together with certain novel means for supporting and operating the saw.

Figure 1:
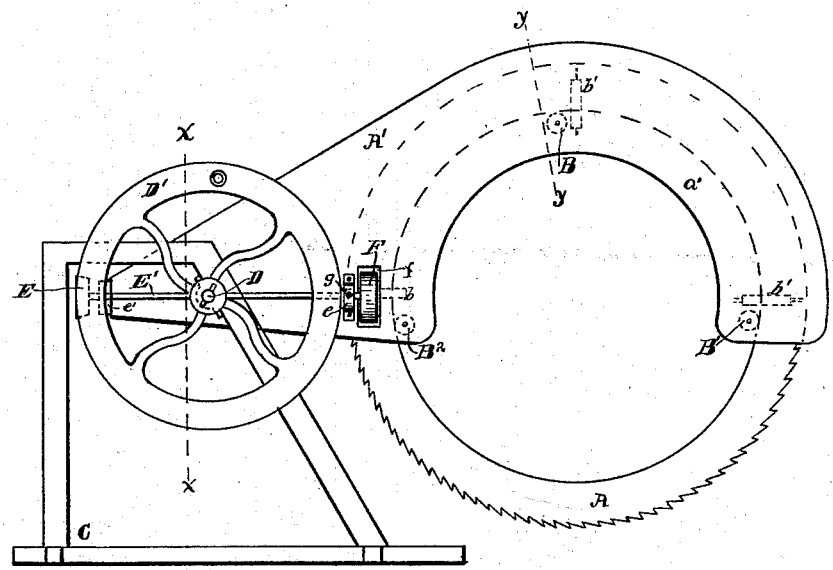
Figure 2:
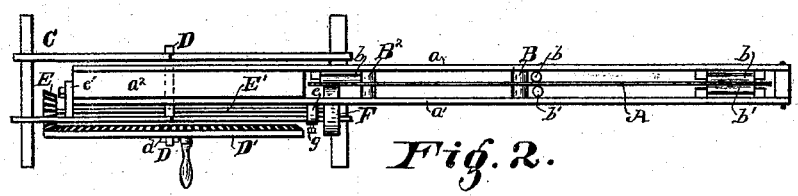
Figure 3:
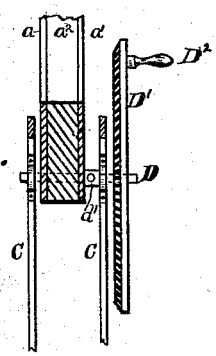
Figure 4:
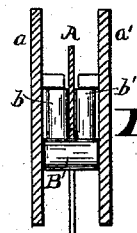

Referring to the drawings forming part of this specification, Figure 1 is a side elevation of my invention. Fig. 2 is a top view of same. Fig. 3 is a sectional view taken at the line $x\,x$, Fig. 1; and Fig. 4 is a sectional view taken at the line $y\,y$, Fig. 1.

A is the saw, which consists of an annular strip of metal about the width of an ordinary crosscut-saw, and having the saw-teeth cut in its outer circumference. This saw is supported, in a manner to be hereinafter described, in the frame $A'$, which consists of two side pieces, $a\ a'$, shaped as shown. Between the rear ends of these pieces is placed the block $a^2$. The purpose of this block is to separate the two side pieces, $a\ a'$, and also to form a solid body at the point where the frame $A'$ is attached to the supporting-frame of the machine. The side pieces, $a\ a'$, and the block $a^2$ are securely fastened together, leaving a space between said side pieces in front of said block, as shown.

The saw is supported in the frame $A'$ by a double system of rollers. The rollers B $B'\ B^2$ extend across the space between the side pieces, $a\ a'$, and turn in proper bearings in said side pieces. These rollers are placed within the circle formed by the saw, and are so situated as to prevent the saw from being displaced either up or down in its frame, the roller B preventing the saw from downward displacement, and the two rollers $B'$ and $B^2$, being placed below the line of the greatest diameter of the circle, prevent the saw from being displaced upward. While the saw is thus prevented from upward or downward displacement, it is left perfectly free to revolve around the rollers B, $B'$, and $B^2$.

The saw is held in the same vertical plane by the rollers $b\ b'$, located on either side of the saw, and between it and the side pieces, $a\ a'$, and turning in proper bearings attached to said side pieces. These rollers $b\ b'$ are made short enough not to interfere with the teeth of the saw in its revolution.

The frame $A'$ is supported on the main supporting-frame C by the bolt or shaft D, which passes through the body of the frame $A'$, as shown, and is journaled in appropriate bearings in the frame C. On one end of the shaft D is located the hand-wheel $D'$, which latter turns loosely on the shaft, but is held in position on the shaft by a pin, $d$, or other appropriate means. This hand-wheel is provided with a suitable handle, $D^2$. On the inner face of this hand-wheel is a bevel-gear, extending entirely around said wheel, which engages with the beveled pinion E. This pinion E is secured to the shaft $E'$, which is journaled in boxes $e\ e'$, secured to the body of the frame $A'$. This shaft $E'$ lies in the same plane as the shaft D, the latter being provided with an enlarged portion, $d'$, through which the shaft $E'$ passes, and in which it is free to turn.

Secured to the end of the shaft $E'$, opposite the pinion E, is the friction-wheel F, which bears against the saw A, an opening, $f$, in the side piece, $a'$, permitting it to reach the saw. One of the rollers, $b$, is placed directly opposite this friction wheel F, so that when the latter is caused to press against the saw this roller $b$ will present a resistance, enabling the operator to cause this friction-wheel to bear against the saw to the desired extent. Any suitable device may be employed for regulating the pressure of the friction-wheel F. In the present instance the journal-box $e$ is provided with a set-screw, $g$, the end of which is free to turn in a half-collar resting against the shaft $E'$. This half-collar may be tightened or loosened according as a greater or less amount of pressure of the friction-wheel F against the saw is required.

From the above construction it will be obvious that when the hand-wheel $D'$ is turned, the friction-wheel F having first been caused to press against the saw, the saw will be caused to revolve around the rollers B, $B'$, and $B^2$, and that the rollers $b\ b'$ will retain the saw in the same plane of revolution.

The teeth of the saw may be so formed that the saw will cut in a direction away from the supporting-frame; or, if desired, they may be so formed that the saw will cut in an opposite direction — that is, toward the supporting-frame.

The saw-frame A' turns freely with the shaft D without in any way affecting the gearing by which the saw is operated, and it will therefore be evident that the saw will work equally well whether it be on top of the log or in the position it will occupy when it has cut into the log. In other words, any position of the saw-frame A' with reference to a horizontal line will in nowise affect the working of the saw.

By the above-described construction the machine may be made very light, and I gain all the advantages of a continuous cutting action of the saw, by which means I am enabled to do much more rapid work than can be done by crosscut-saws as now constructed.

It will be evident that the principles of my invention as above described may be employed in power saws with advantage by attaching a belt-pulley to the wheel D.

It will also be evident that the saw may be formed of two or more sections, the sections being firmly brazed together, which construction will render the manufacture of the saw cheaper than it would be if the saw were made in one piece.

What I claim as new and of my invention, and desire to secure by Letters Patent, is—

1. The combination of the saw-supporting frame A', consisting of the segments $a\ a'$, suitably connected and containing rollers, as B B' $B^2$ and $b\ b'$, and the saw arranged to rotate between said segments, and the shaft D, connecting the supporting-frame A' to the main supporting-frame, and permitting said frame A' to turn on said shaft D, substantially as and for the purposes specified.

2. The combination of saw-supporting frame A', consisting of the segments $a\ a'$, suitably connected, and containing rollers, as B B' $B^2$, and as $b\ b'$, and the saw arranged to rotate between said segments and carrying the boxes $e\ e'$, and the shaft E', journaled in said boxes, and provided with friction-wheel F, and the geared wheel and its shaft D, whereby the saw-supporting frame A' is hinged to the main supporting-frame, substantially as and for the purposes specified.

3. In a sawing-machine, the combination of the saw-frame A', hinged to the supporting-frame C by shaft D, carrying the operating hand or power wheel D', shaft E', supported in bearings $e\ e'$, carrying friction-wheel F, and pinion E, engaging a gear on wheel D', and saw A and anti-friction rollers, as $b\ b'$, preventing its lateral displacement, and anti-friction rollers, as B B' $B^2$, preventing displacement in the direction of its operating plane, substantially as and for the purposes specified.

OSCAR F. SILCOTT.

Witnesses:
W. F. GOODWIN,
E. A. KNOWLES.